United States Patent [19]

Haustein

[11] Patent Number: 5,676,515

[45] Date of Patent: Oct. 14, 1997

[54] LOW FLOOR VEHICLE RAMP

[76] Inventor: Norman E. Haustein, 2329 Longboat Dr., Naples, Fla. 33942

[21] Appl. No.: 657,365

[22] Filed: Jun. 3, 1996

[51] Int. Cl.⁶ ............................................... B60P 1/43
[52] U.S. Cl. ................ 414/537; 14/69.5; 414/921
[58] Field of Search ............................ 414/537, 538, 414/921; 296/26; 14/69.5, 71.1

[56] References Cited

U.S. PATENT DOCUMENTS

| | | | |
|---|---|---|---|
| 4,131,209 | 12/1978 | Manning | 414/537 |
| 4,556,128 | 12/1985 | Thorley et al. | 414/921 X |
| 4,685,858 | 8/1987 | Manning et al. | 414/537 |
| 4,722,109 | 2/1988 | Mountz | 414/537 X |
| 5,110,252 | 5/1992 | Aoki | 414/921 X |
| 5,133,634 | 7/1992 | Gingrich et al. | 414/537 |
| 5,160,236 | 11/1992 | Redding et al. | 414/537 |
| 5,253,410 | 10/1993 | Mortenson | 414/537 X |
| 5,257,894 | 11/1993 | Grant | 414/537 |
| 5,305,486 | 4/1994 | Smith et al. | 414/921 X |
| 5,380,144 | 1/1995 | Smith et al. | 414/537 |
| 5,393,191 | 2/1995 | Hall et al. | 414/537 |

FOREIGN PATENT DOCUMENTS 2224992   5/1990   United Kingdom .

*Primary Examiner*—David A. Bucci
*Attorney, Agent, or Firm*—Merrill N. Johnson

[57] ABSTRACT

A low-floor-vehicle ramp has a slideway (13) attached to a bottom side of a vehicle floor (2) proximate a door sill, a boarding-ramp assembly (1) hinged to a ramp-control plate (14) that slides on parallel slideways (22, 23, 59, 60, 68) as actuated horizontally by motorized bidirectional actuation of a ramp-slide actuator (16, 56) that is affixed to the vehicle (3) and has a horizontally actuating member (17, 58) attached to the ramp-control plate. A floor-access plate (9) forms an access bridge between the boarding-ramp assembly and the vehicle floor. Foldable side barriers (7, 8) on outside edges of the boarding-ramp assembly spring to an upright mode automatically in extended mode. A ramp switch (10) is operated by a driver of the vehicle. Tool-operative backup gearing (19) is provided for operation with various types of hand-operative or motor-operative tools (20, 21) in event of failure of the ramp-slide actuator.

20 Claims, 4 Drawing Sheets

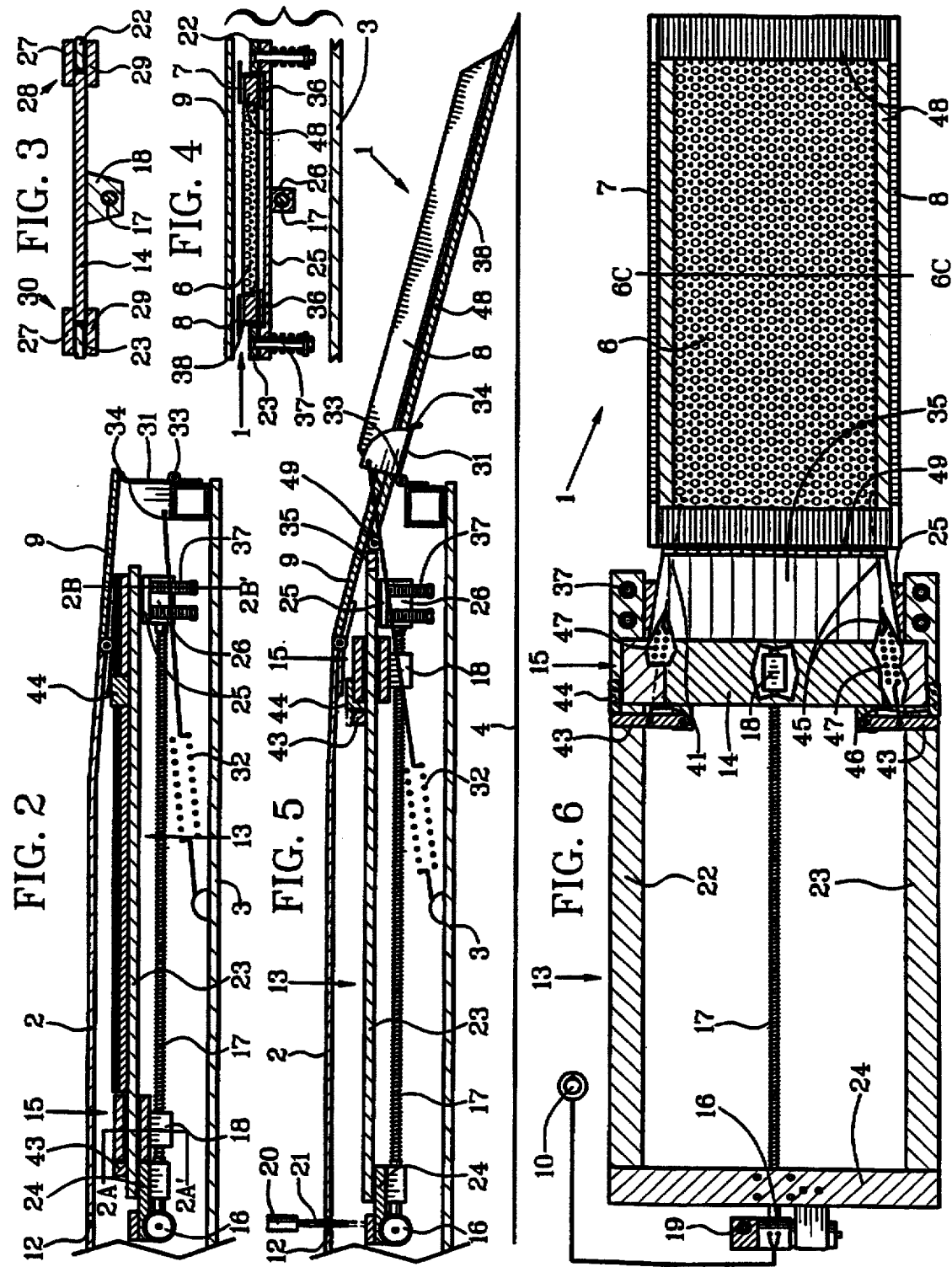

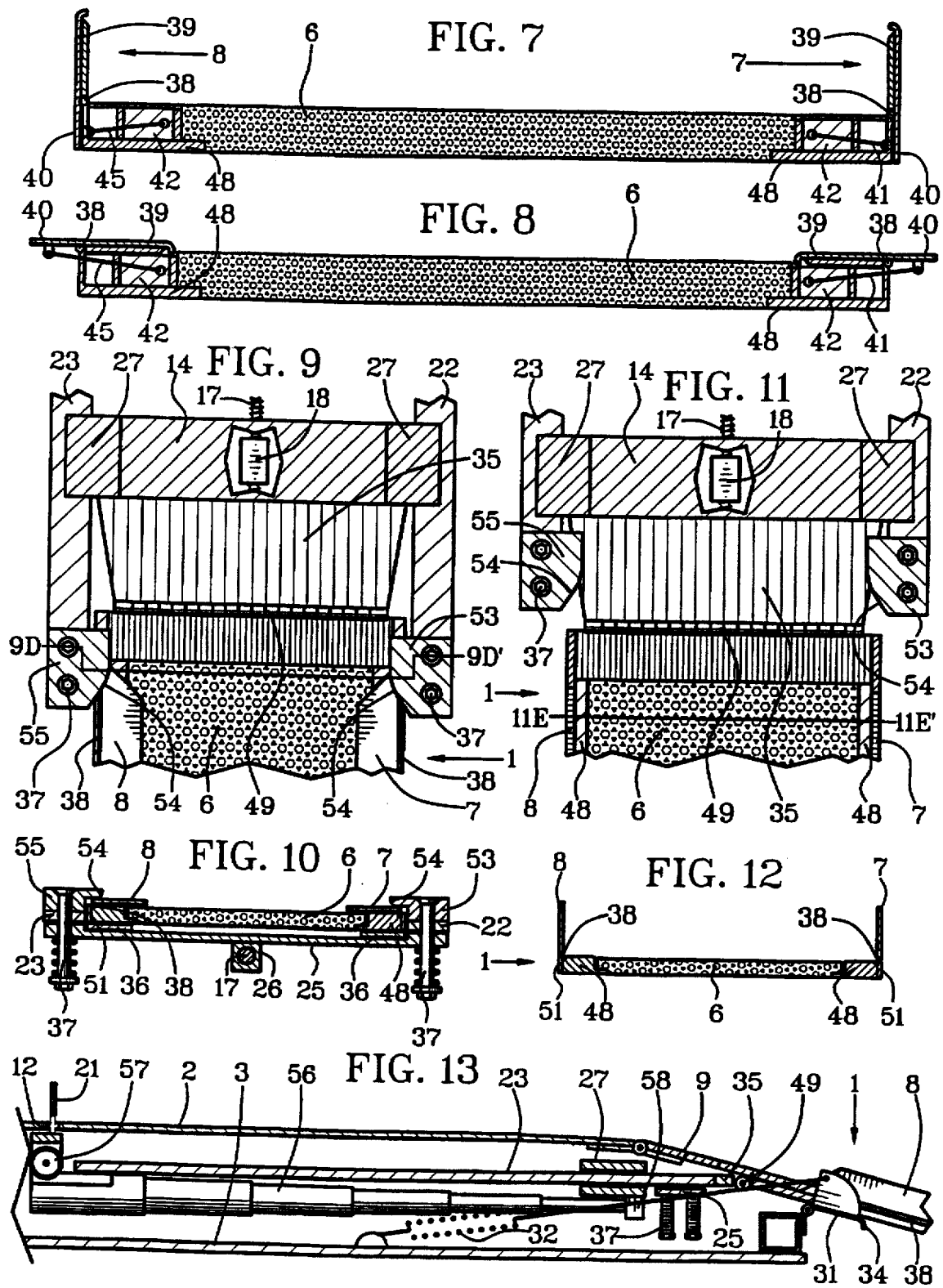

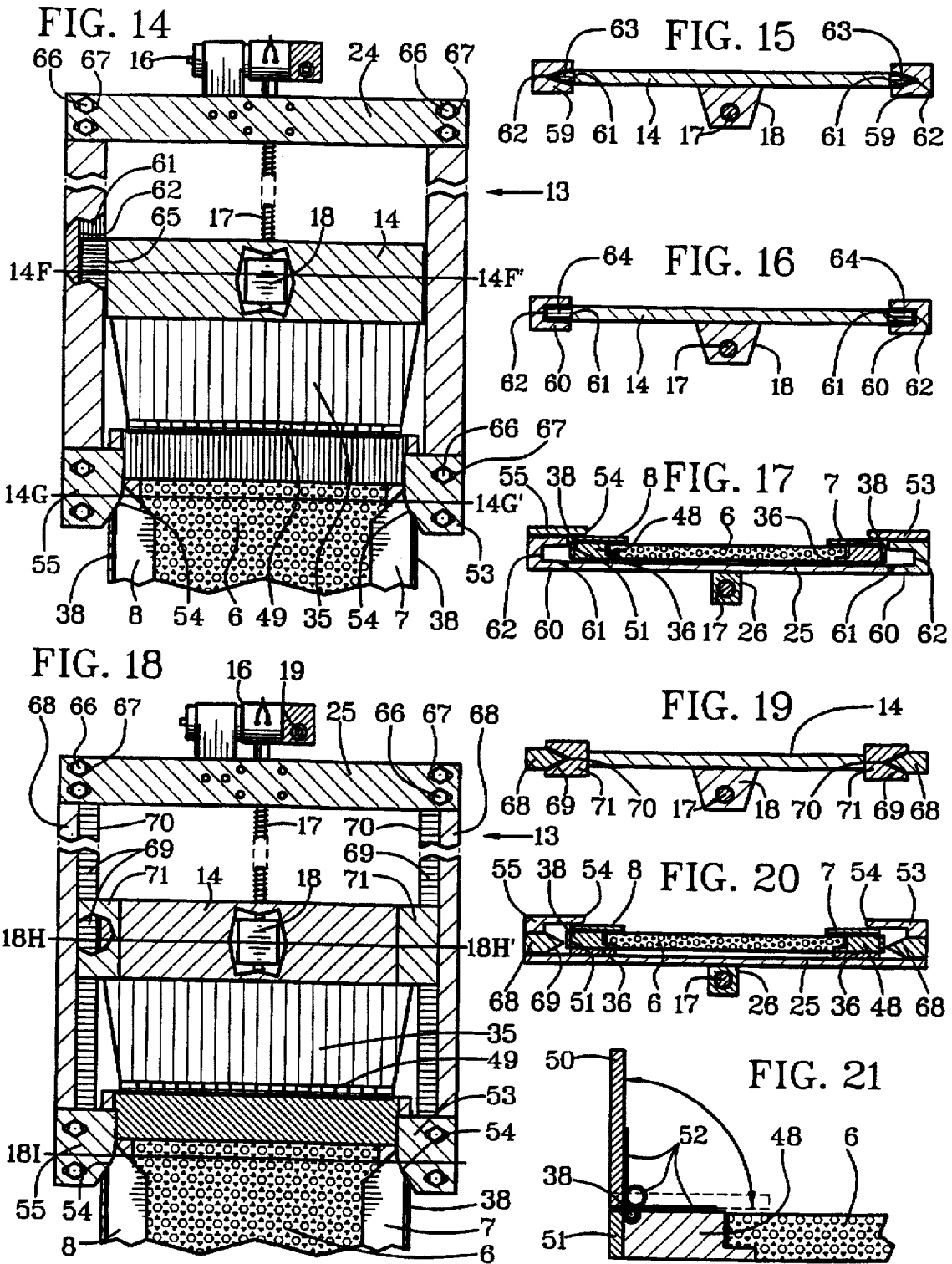

LOW FLOOR VEHICLE RAMP

BACKGROUND OF THE INVENTION

1. Field of the Invention

This invention relates to wheelchair ramps on public vehicles and vans and in particular to wheelchair ramps for vehicles having low floors for access by handicapped people.

2. Description of Related Art

Low-floor-vehicle ramps for handicapped people and wheelchair access have been designed previously with a variety of extension controls and support means. None are known, however, to have ramp-angle control, retractable side barriers, a floor-access ramp and other features as taught by this invention. Different but related vehicle ramps are described in the following patent documents. U.S. Pat. No. 5,380,144, issued to Smith et al on Jan. 10, 1995, described a vehicle ramp that lowered and raised with a cable on a boom arm. U.S. Pat. No. 5,357,869, issued to Barjolle et al on Oct. 25, 1994, taught a railroad-car ramp comprised of a board that was lowered and raised with an actuator on the railroad car. U.S. Pat. No. 4,759,682, issued to Hood on Jul. 26, 1988, described a vehicle ramp that was limited to a mechanism for raising and lowering an inner end of the ramp vertically to be flush with a vehicle floor when the ramp was extended. U.S. Pat. No. 4,251,179, issued to Thorley on Feb. 17, 1981, described a device for replacing normal steps with a structure comprising a load-carrying platform made of four parallel sections that were hinged together such that they could be folded into fewer steps. It was limited to a device acting alternately as a load-carrying lift or as a step structure between a lower level and an upper level.

SUMMARY OF THE INVENTION

In light of need for a more convenient, safe, compact and inexpensive wheelchair ramp for low-floor vehicles, objects of this invention are to provide a low-floor-vehicle ramp which:

- Is thin from-top-to-bottom for requiring minimal space below a vehicle floor;
- Has foldable side barriers that are automatically operable mechanically to contain wheels of wheelchairs;
- Has a floor-access plate to bridge between a ramp plate and a vehicle floor to avoid a step or mechanical raising of an inside end of the ramp plate;
- Has automatic positioning of an extended end of the ramp plate in relation to various heights of a top surface of a curb or of a road surface;
- Can be push-button operated by a vehicle driver;
- Has backup hand-tool operation; and
- Is inexpensive to produce, inexpensive to install, adaptable to a wide variety of vehicle floors, safe and long lasting.

This invention accomplishes these and other objectives with a low-floor-vehicle ramp having a slideway attached to a bottom side of a vehicle floor proximate a door sill and having a boarding-ramp assembly hinged to a ramp-control plate that slides on parallel slideways as actuated horizontally by motorized bidirectional actuation of a ramp-slide actuator that is affixed to the vehicle and further having a horizontally actuating member attached to the ramp-control plate. A floor-access plate has an inside edge hinged to an outside edge of the vehicle floor and an outside edge that rests on a ramp-support member that is attached pivotally to the vehicle at a position vertically below the outside edge of the vehicle floor. When the boarding-ramp assembly is extended fully, the outside edge of the floor-access plate is positioned at a top surface of an inside end of the boarding-ramp assembly to form an access bridge between the boarding-ramp assembly and the vehicle floor. Foldable side barriers on outside edges of the boarding-ramp assembly remain in a horizontally down-folded mode until the boarding-ramp assembly is near fully extended and then spring to an upright mode. Bidirectional operation of the threaded shaft is powered by a motor in response to a ramp switch that is operated by a driver of the vehicle. Tool-operative backup gearing is provided for operation with various types of hand-operative or motor-operative tools in event of failure of the ramp-slide actuator.

BRIEF DESCRIPTION OF DRAWINGS

This invention is described by appended claims in relation to description of a preferred embodiment with reference to the following drawings which are described briefly as follows:

FIG. 2 is a sectional side view of a low-floor-vehicle ramp in a vehicle-travel mode with a boarding-ramp assembly retracted with a ball-screw actuator;

FIG. 3 is a cross-sectional view of a slide on a slideway at a section line AA' in FIG. 2;

FIG. 4 is a cross-sectional view of a boarding-ramp assembly in a vehicle-travel mode at a section line BB' in FIG. 2;

FIG. 5 is a sectional side view of a low-floor-vehicle ramp in a handicap-pickup mode with a boarding-ramp assembly extended to a roadway with a ball-screw actuator;

FIG. 6 is a top view of a low-floor-vehicle ramp in a handicap-pickup mode with a boarding-ramp assembly extended;

FIG. 7 is a cross-sectional view of a boarding-ramp assembly in a handicap-pickup mode with lever-operated side barriers up at a section line CC' in FIG. 6;

FIG. 8 is the FIG. 7 illustration with side barriers folded down;

FIG. 9 is a sectional top view of an inside end of a boarding-ramp assembly having foldable barriers in folded mode by fold-operational contact with barrier folders on outside ends of plate types of slideways;

FIG. 10 is a cross-sectional view at section line DD' in FIG. 9;

FIG. 11 is a sectional top view of an inside end of a boarding-ramp assembly having foldable barriers in unfolded mode by being positioned outside of fold-operational contact with barrier folders on outside ends of plate types of slideways;

FIG. 12 is a cross-sectional view of a boarding-ramp assembly with unfolded barriers at section line EE' in FIG. 11;

FIG. 13 is a sectional side view of a low-floor-vehicle ramp in a handicap-pickup mode with a boarding-ramp assembly extended with a fluid-operative actuator;

FIG. 14 is a sectional top view of an end of a low-floor-vehicle ramp having foldable barriers in folded mode by fold-operational contact with barrier folders on outside ends of V-types or U-types of slideways;

FIG. 15 is a cross-sectional view of an embodiment with V-type slideways at section line FF' in FIG. 14.

FIG. 16 is a cross-sectional view of an embodiment with U-type slideways at section line FF' in FIG. 14.

FIG. 17 is a cross-sectional view at section line GG' in FIG. 14;

FIG. 18 is a sectional top view of an end of a low-floor-vehicle ramp having foldable barriers in folded mode by fold-operational contact with barrier folders on outside ends of ridge types of slideways;

FIG. 19 is a cross-sectional view at section line HH' in FIG. 18;

FIG. 20 is a cross-sectional view at section line II' in FIG. 18; and

FIG. 21 is an enlarged sectional view of spring-loaded side barrier for use in working relationship to barrier folders on ends of slideways.

DESCRIPTION OF PREFERRED EMBODIMENT

Figure 1:
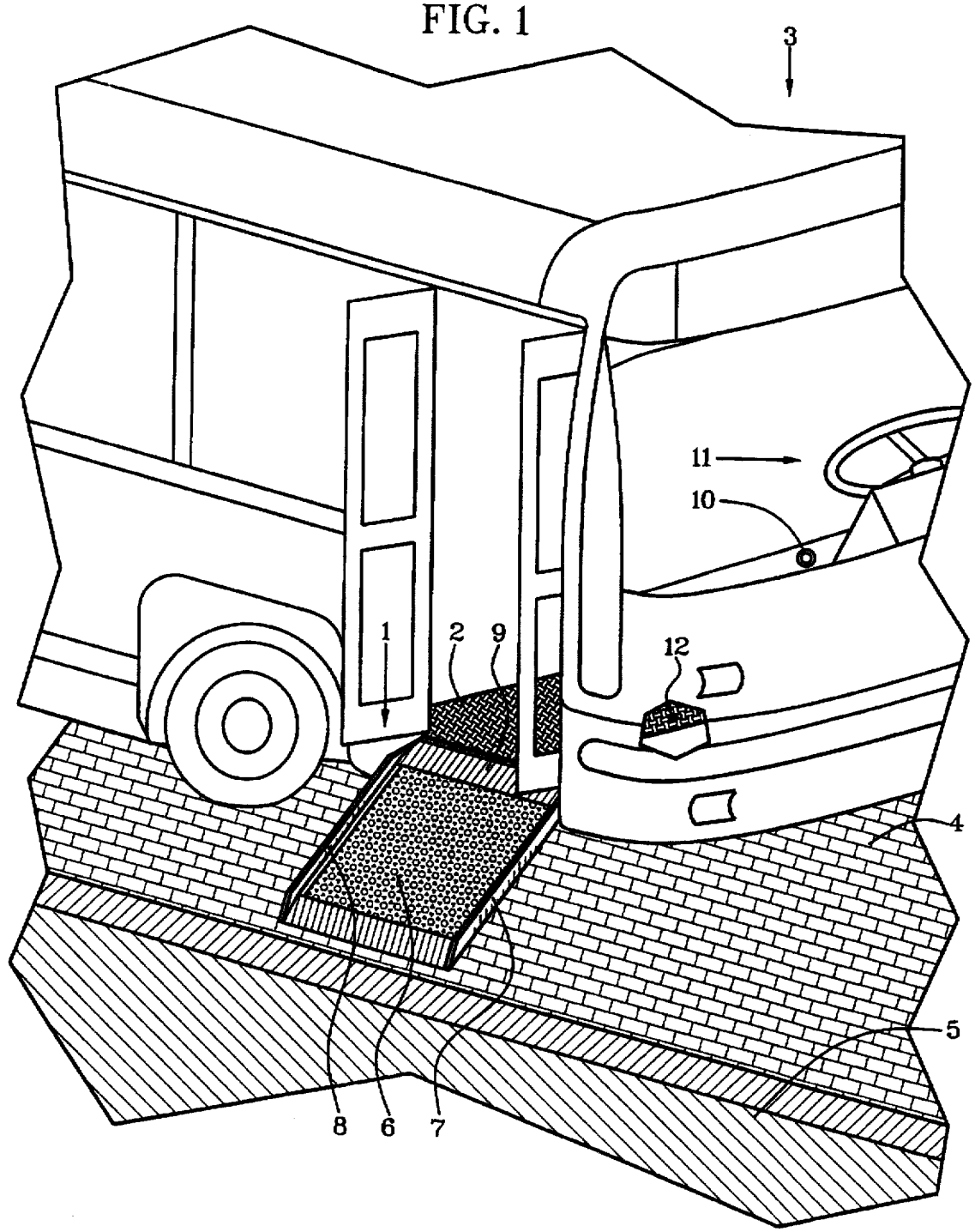
FIG. 1 is a perspective view of a front section of a low-floor vehicle from which a boarding-ramp assembly is extended to a roadway in a handicap-pickup mode.

Reference is made first to FIG. 1. A boarding-ramp assembly 1 is positioned selectively intermediate a vehicle-travel mode with the boarding-ramp assembly 1 vertically under a vehicle floor 2 of a low-floor vehicle 3 and a handicap-pickup mode with an outside end of the boarding-ramp assembly 1 extended in a slanted attitude to a roadway 4 or a curb 5. The boarding ramp assembly 1 has a ramp floor 6 that preferably has at least a surface that is made of nonskid material.

A forward side barrier 7 and a rearward side barrier 8 are provided on the boarding-ramp assembly 1 to arrest side travel of wheels of wheelchairs on the ramp floor 6.

Bridging between the vehicle floor 2 and the ramp floor 6 in a handicap-pickup mode is a floor-access plate 9 that is hinged to an outside edge of the vehicle floor 2 proximate a bottom of a door sill. The bottom of the door sill is an outside edge of the vehicle floor 2 that is not indicated separately.

Positioning of the boarding-ramp assembly is motorized with control by an operational switch 10 that is positioned in operative proximity to vehicular driving controls 11. A backup-operational access 12 is positioned for convenience of operation with various hand-operative and motor-operative tools in event of failure of motorized operation.

Referring to FIGS. 2–6, a slideway 13 comprising a pair of parallel slide rails of preferably a plate type of slideway is attached to a vehicle 3 proximate a bottom side of a vehicle floor 2 vertically below a door sill of the vehicle 3. The boarding-ramp assembly 1 is positioned selectively intermediate a vehicle-travel mode shown in FIGS. 2–4 and a handicap-pickup mode shown in FIGS. 1 and 5–6 with a ramp-control plate 14 that is shown in FIGS. 3 and 6.

The ramp-control plate 14 is attached to a ramp slide 15 that is in sliding contact with the slideway 13. As a preferred ramp-slide actuator, a bidirectionally operable motorized means has a bidirectional motor 16 with a gear means from which an externally threaded shaft 17 is extended intermediate an inside end and an outside end of the slideway 13.

The threaded shaft 17 has machine threads in threaded engagement with an internally threaded nut 18 that is attached to the ramp-control plate 14. The threaded shaft 17 and the threaded nut 18 are preferably ball-threaded.

A backup gear on the bidirectional motorized means can have a gear fitting 19 that is operable by a hand tool such as a motorized hand tool 20 having a tool shaft 21 that is inserted through the backup-operational access 12 for operating the bidirectional motorized means or gears attached thereto as designed in event of failure of power to the bidirectional motorized means such as the bidirectional motor 16.

Shown in FIGS. 3–4 and 6 are a first slide rail 22 that is extended inward from a forward side of the door sill and a second slide rail 23 that is extended inward from a rearward side of the door sill. An inside tie rod 24 shown in FIGS. 2, 5 and 6 is positioned in joining relationship between inside ends of parallel slide rails such as the first slide rail 22 and the second slide rail 23. An outside tie rod 25 shown in FIGS. 2, 4, 5 and 6 is positioned in joining relationship between outside ends of parallel slide rails such as the first slide rail 22 and the second slide rail 23. An anchor bearing 26 can be provided on the outside tie rod 25 for rotational housing of a distal end of such threaded shaft 17 as may be employed.

Detailed mostly in FIG. 3, a bottom surface of a top side plate 27 of a first-rail slide 28 is in sliding contact with a top surface of the first slide rail 22 and a top surface of the bottom slide plate 29 of the first-rail slide 28 is in sliding contact with a bottom surface of the first slide rail 22. At the opposite side, a bottom surface of the top slide plate 27 of a second-rail slide 30 is in sliding contact with a top surface of the second slide rail 23 and a top surface of the bottom slide plate 29 of the second-rail slide 30 is in sliding contact with a bottom surface of the second slide rail 23. The first-rail slide 28 and the second-rail slide 30 can be one-piece bifurcations or a substitution of equivalents with two plates attached to opposite surfaces of opposite ends of the ramp-control plate 14. Sliding contact of surfaces is relative to working relationship of parts, not necessarily a constantly precise physical contact.

Referring further to FIGS. 1–6, a ramp-support member 31 is pivotal outwardly from an outside edge of the vehicle 3 in opposition to resilient resistance of a support-member spring 32. The support-member spring 32 is preferably an expansion-resistant coil spring having a proximal end or an end of an extension from it affixed to an inward portion of the vehicle 3. A distal end of the support-member spring 32 or an extension from it is affixed to a top portion of the ramp-support member 31. Alternatively, a support-member hinge 33 at a pivot point can be spring-loaded.

The support-member spring 32 can be made to maintain the boarding-ramp assembly 1 in a relatively horizontal attitude until an outside end of the boarding-ramp assembly 1 is nearly extended. This positions the outside end of the boarding-ramp assembly 1 above a curb 5 that may be present before being lowered to position. It prevents positioning of the outside end of the boarding-ramp assembly 1 at a bottom of a curb 5 in order to minimize slope angle of the boarding-ramp assembly 1. Normally, the slope angle will be less than fifteen degrees with the outside end of the boarding-ramp assembly 1 positioned on a roadway 4.

With positioning of the outside end of the boarding-ramp assembly 1 on top of a curb 5, the slope angle can be less than five degrees. This is near an angle of vehicle floors 2 near a door of some types of low-floor vehicles.

A ramp-support surface 34 of the ramp-support member 31 is positioned vertically lower than the door sill to support the hinged floor-access plate 9 in vehicle-travel mode. The ramp-support member 31 is pivotal outwardly and downwardly from the outside edge of the vehicle 3 by contact with the boarding-ramp assembly 1 in travel between vehicle-travel mode and handicap-pickup mode. In handicap-pickup mode, a pivot point of the ramp-support member 31 supports the inside end of the boarding-ramp assembly 1 and the floor-access plate 9 rests proximate a top side of the inside end of the boarding-ramp assembly 1. This bridges a gap between a top surface of the vehicle floor 2 and a top surface of the boarding-ramp assembly 1 in handicap-pickup mode.

Detailed mostly in FIG. 4 and shown partly in FIGS. 2; 5 and 6, the outside tie rod 25 supports the outside portion of the boarding-ramp assembly 1 that is not supported by hinged attachment to a ramp-control extension 35 during positioning of the boarding-ramp assembly 1. A slide bearing 36 on a top surface of the outside tie rod 25 can be provided as a wear surface. Further, the slide bearing 36 can be a plastic or other composite material which also absorbs sound for quiet travel of the boarding-ramp assembly 1 inwardly and outwardly. To further absorb sound, to provide automatic adjustment of support and to provide a cushioned access, spring-supported bolts 37 can be employed for connecting the outside tie rod 25 to the outside ends of the first slide rail 22 and the second slide rail 23.

Referring to FIGS. 2–8 as detailed mostly in FIGS. 6–8, the forward-side barrier 7 and the rearward-side barrier 8 are lowered automatically to a horizontal attitude for vehicle-travel mode and raised automatically to an upright attitude for handicap-pickup mode on barrier hinges 38 that are positioned intermediate a railing portion 39 and a lever portion 40. A forward barrier cable 41 is attached to the lever portion 40 of the forward-side barrier 7 and routed first perpendicularly to an axis of the barrier hinge 38 and then in contact with an alignment member 42 with which the forward barrier cable 41 is routed colinearly with the axis of the barrier hinge 38 in an inward direction to a cable lever 43 that is attached pivotally to the ramp-control plate 14. A forward barrier-control buttress 44 on the first slide rail 22 is positioned to engage a pivotal end of the cable lever 43 during a barrier-raising portion of outward travel of the boarding-ramp assembly 1.

Likewise on an opposite side, a rearward barrier cable 45 is attached to the lever portion 40 of the rearward-side barrier 8 and routed first perpendicularly to an axis of the barrier hinge 38 and then in contact with an alignment member 42 with which the rearward barrier cable 45 is routed colinearly with the axis of the barrier hinge 38 in an inward direction to a cable lever 43 that is attached pivotally to the ramp-control plate 14. A rearward barrier-control buttress 46 on the second slide rail 23 is positioned to engage a pivotal end of the cable lever 43 during a barrier-raising portion of outward travel of the boarding-ramp assembly 1. A weighted inward side of the barriers 7 and 8 can be employed to cause them to fall to a horizontal attitude when not raised with the barrier cables 41 and 45. A barrier-cable spring 47 can be provided in the forward barrier cable 41 and in the rearward barrier cable 45.

A high-tensile framework 48 can be provided for housing the ramp floor 6 and for a base for attachment of the barrier hinges 38, a ramp hinge 49 and other structural components of the boarding-ramp assembly 1.

Referring to FIGS. 9–12 and 21, alternatively to barrier-cable operation of the side barriers 7 and 8 can be their operation with barrier folders in opposition to spring-loaded hinges. As shown in FIG. 21, a spring-loaded barrier 50 can be hinged to a framework 48 with a barrier hinge 38 that is spring-tensioned to force the spring-loaded barrier 50 from a horizontal attitude depicted with dashed lines to a vertical attitude depicted with solid lines when positioned out from under a barrier folder. When in an upright position, a bottom end of the spring-loaded barrier 50 rests on a barrier abutment 51 to maintain the spring-loaded barrier 50 in an upright attitude against force from wheels of wheelchairs and other forces on the ramp floor 6. A torsional spring 52 or other type of spring with torsional force that is linear to an axis of the barrier hinge 38 can be employed. Typically, such a spring 52 would be positioned in line with the barrier hinge 38 where it would not obstruct hinged operation of the spring-loaded barrier 50. Spring-loaded barriers 50 can be used in place of barriers 7 and 8.

FIGS. 9–10 show spring-loaded barriers closed in horizontal attitude under barrier folders while FIGS. 11–12 show the spring-loaded barriers open in vertical attitude where out from under the barrier folders. Specifically, a forward side barrier 7 is hinged to a forward side of a boarding-ramp assembly 1 with a hinge 38 that is spring-tensioned, as with spring 52 in FIG. 21, to pivot from a horizontal attitude to a vertical attitude. A forward barrier folder 53 that is positioned proximate an outside end of a first slide rail 22 or other form of slideway 13 has a cam surface 54 that is bevelled to engage the forward side barrier 7 in an upright attitude and to pivot the forward side barrier 7 to a horizontal attitude vertically under the forward barrier folder 53 during inward travel of the boarding-ramp assembly 1 and conversely to allow upward positioning of the forward side barrier 7 during outward travel of the boarding-ramp assembly 1. At an opposite side of a slideway 13, a rearward barrier folder 55 that is positioned proximate an outside end of a second slide rail 23 or other form of slideway 13 has a cam surface 54 that is bevelled to engage the rearward side barrier 8 in an upright attitude and to pivot the rearward side barrier 8 to a horizontal attitude vertically under the rearward barrier folder 55 during inward travel of the boarding-ramp assembly 1 and conversely to allow upward positioning of the rearward side barrier 8 during outward travel of the boarding-ramp assembly 1.

FIG. 13 illustrates a fluid-operative cylinder 56 that is operated by gaseous or liquid fluid from a bidirectionally motorized pump 57 as a foreseeable alternative to the threaded shaft 17 that is described in relation to FIGS. 2–6. An actuational portion can be a cylinder attachment 58 on the ramp-control plate 14.

In FIGS. 14–17, slideways 3, also referred to as channel rails, that are V-shaped and slideways 13, also referred to as channel rails, that are U-shaped are illustrated with forward barrier folders 53 that fold and unfold forward side barriers 7 and with rearward barrier folders 55 that fold and unfold rearward side barriers 8 by action of cam surface 54 as described in relation to FIGS. 9–12. V-shaped channel rails 59 shown in FIG. 15 and U-shaped channel rails 60 shown in FIG. 16 appear the same from a top view in FIG. 14. In V-shaped channel rails 59 and in U-shaped channel rails 60 alike, channel walls 61 are extended from a channel floor 62 to channel tops that comprise inside edges of respective channel rails 59 and 60 which are referred to collectively as slideway 13. V-ridge slides 63 and U-ridge slides 64 on opposite ends of a ramp-control plate 14 have ridge walls 65 that are complimentary to channel walls 61 of the V-shaped channel rails 59 and the U-shaped channel rails 60. A main difference is that channel walls 61 of U-shaped channel rails 60 are near perpendicular or are perpendicular in relation to a the channel floor 62. In contrast, channel walls 61 of V-shaped channel rails 59 intersect substantially at the channel floor 62.

Adjustment of fit or closeness of contact of channel walls 61 in relation to ridge walls 65 can be provided accurately, rigidly and reliably by joining the inside tie rod 24 and the outside tie rod 25 to the channel rails 59 and 60, or to other types of slideways having bevelled channel walls 61, with fastener bolts 66 in laterally elongated bolt holes 67. Extensions from the boarding-ramp assembly 1 also can be made to ride in the channels 59 and 60.

In FIGS. 18–20, slideways 13, also referred to as channel rails, are illustrated with forward barrier folders 53 that fold and unfold forward side barriers 7 and with rearward barrier folders 55 that fold and unfold rearward side barriers 8 by action of cam surface 54 as described in relation to FIGS. 9–12. Ridge-shaped channel rails 68 illustrated in FIGS. 19–20 are shown from a top view in FIG. 18. Ridge walls 69 intersect at a ridge peak 70 and have ridge slopes with slope angles that are complementary to slope angles of V-channel slides 71 that are attached to ramp-control plate 14. The V-channel slides 71 are in sliding contact with the ridge-shaped channel rails 68.

As described in relation to FIG. 14, fastener bolts 66 in laterally elongated bolt holes 67 can be employed for adjustment of closeness of fit of sliding surfaces of these and other slideways 13 having bevelled channel walls.

A new and useful low-floor-vehicle ramp having been described, all such modifications, adaptations, substitutions of equivalents, combinations of parts, pluralities of parts, applications and forms thereof as described by the following claims are included in this invention.

I claim:

1. A low-floor-vehicle ramp comprising:
   a slideway attached to a vehicle proximate a bottom side of a floor of the vehicle at a position vertically below a door sill of the vehicle;
   a boarding-ramp assembly positioned selectively intermediate a vehicle-travel mode on the slideway and a handicap-pickup mode extended from the slideway;
   a ramp slide having sliding attachment to the slideway;
   a ramp-control plate on the ramp slide;
   a ramp floor on the boarding-ramp assembly;
   the boarding-ramp assembly having an inside end that is hinged to an outside edge of the ramp-control plate;
   a ramp-slide actuator affixed to the vehicle and having a horizontally actuating member attached to the ramp-control plate;
   a ramp-support member attached to the vehicle and having a ramp-support surface positioned proximate an outside edge of the vehicle and designedly lower vertically than the door sill;
   a floor-access plate having an inside edge hinged to an outside edge the floor at a position proximate the door sill;
   the floor-access plate having an outside edge resting on the ramp-support member with the boarding-ramp assembly in a vehicle-travel mode and the outside edge of the floor-access plate being positioned proximate a top surface of the ramp floor with the boarding-ramp assembly in handicap-pickup mode; and
   side barriers on sides of the boarding-ramp assembly.

2. A low-floor-vehicle ramp as described in claim 1 wherein:
   the slideway is a pair of parallel slide rails with a first slide rail extended inward from a forward side of the door sill and a second slide rail extended inward from a rearward side of the door sill;
   an inside tie rod is positioned intermediate inside ends of the pair of parallel slide rails; and
   an outside tie rod is positioned intermediate outside ends of the pair of parallel slide rails.

3. A low-floor-vehicle ramp as described in claim 2 wherein:
   the ramp-control plate is extended intermediate a first-rail slide and a second-rail slide on the ramp slide;
   the first-rail slide is in sliding contact with the first slide rail; and
   the second-rail slide is in sliding contact with the second slide rail.

4. A low-floor-vehicle ramp as described in claim 3 wherein:
   the first slide rail is a plate rail and the second slide rail is a plate rail;
   the first-rail slide is a bifurcation having a top slide plate and a bottom slide plate extended parallel from a first end of the ramp-control plate;
   a bottom surface of the top slide plate of the first-rail slide is in sliding contact with a top surface of the first slide rail;
   a top surface of the bottom slide plate of the first-rail slide is in sliding contact with a bottom surface of the first slide rail;
   the second-rail slide is a bifurcation having a top slide plate and a bottom slide plate extended from a second end of the ramp-control plate;
   a bottom surface of the top slide plate of the second-rail slide is in sliding contact with a top surface of the second slide rail; and
   a top surface of the bottom slide plate of the second-rail slide is in sliding contact with a bottom surface of the second slide rail.

5. A low-floor-vehicle ramp as described in claim 3 wherein:
   the first slide rail is a ridge rail having ridge slopes extended forwardly at a design angle from a ridge peak of the first slide rail and the second slide rail is a ridge rail having ridge slopes extended rearwardly at a design angle from a ridge peak of the second slide rail;
   the first-rail slide is a bifurcation having a top slide plate and a bottom slide plate extended angularly from a first end of the ramp-control plate at angles complimentary to design angles of ridge slopes of the first slide rail;
   a bottom surface of the top slide plate of the first-rail slide is in sliding contact with a top surface of the first slide rail;
   a top surface of the bottom slide plate of the first-rail slide is in sliding contact with a bottom surface of the first slide rail;
   the second-rail slide is a bifurcation having a top slide plate and a bottom slide plate extended angularly from a second end of the ramp-control plate at angles complimentary to design angles of ridge slopes of the second slide rail;
   a bottom surface of the top slide plate of the second-rail slide is in sliding contact with a top surface of the second slide rail; and
   a top surface of the bottom slide plate of the second-rail slide is in sliding contact with a bottom surface of the second slide rail.

6. A low-floor-vehicle ramp as described in claim 3 wherein:
   the first slide rail is a V-channel rail having channel walls extended rearwardly at a design angle from a channel floor of the first slide rail and the second slide rail is a V-channel rail having channel walls extended forwardly at a design angle from a channel floor of the second slide rail;

the first-rail slide is a ridge member having a top slope and a bottom slope extended angularly from a first end of the ramp-control plate at angles complimentary to design angles of channel walls of the first slide rail;

a top surface of the top slope of the first-rail slide is in sliding contact with a top channel wall of the first slide rail;

a bottom surface of the bottom slope of the first-rail slide is in sliding contact with a bottom channel wall of the first slide rail;

the second-rail slide is a ridge member having a top slope and a bottom slope extended angularly from a second end of the ramp-control plate at angles complimentary to design angles of channel walls of the second slide rail;

a top surface of the top slope of the second-rail slide is in sliding contact with a top channel wall of the second slide rail; and a bottom surface of the bottom slope of the second-rail slide is in sliding contact with a bottom channel wall of the second slide rail.

7. A low-floor-vehicle ramp as described in claim 3 wherein:

the first slide rail is a U-channel rail having channel walls extended rearwardly at design perpendicularity from a channel floor of the first slide rail and the second slide rail is a U-channel rail having channel walls extended forwardly at design perpendicularity from a channel floor of the second slide rail;

the first-rail slide is a ridge member having a top wall and a bottom wall extended from a first end of the ramp-control plate at complimentary perpendicularity to channel walls of the first slide rail;

a top surface of the top wall of the first-rail slide is in sliding contact with a top channel wall of the first slide rail;

a bottom surface of the bottom wall of the first-rail slide is in sliding contact with a bottom channel wall of the first slide rail;

the second-rail slide is a ridge member having a top wall and a bottom wall extended from a second end of the ramp-control plate at complimentary perpendicularity to channel walls of the second slide rail;

a top surface of the top wall of the second-rail slide is in sliding contact with a top channel wall of the second slide rail; and a bottom surface of the bottom wall of the second-rail slide is in sliding contact with a bottom channel wall of the second slide rail.

8. A low-floor-vehicle ramp as described in claim 1 wherein:

the ramp-slide actuator is a bidirectionally operable motorized means having a motorized portion attached to an inside end of the ramp slide and an actuational portion attached to the ramp-control plate.

9. A low-floor-vehicle ramp as described in claim 8 wherein:

the bidirectionally operable motorized means is a bidirectional motor from which an externally threaded shaft is extended intermediate the inside end of the slideway and an outside end of the slideway; and the actuational portion is an internally threaded nut attached to the ramp-control plate and having thread engagement with the externally threaded shaft.

10. A low-floor-vehicle ramp as described in claim 9 wherein:

the externally threaded shaft is ball-threaded and the internally threaded nut is a ball nut.

11. A low-floor-vehicle ramp as described in claim 8 wherein:

the bidirectionally operable motorized means is a bidirectionally motorized pump from which at least one fluid-operative cylinder is extended intermediate the inside end of the ramp slide and an outside end of the ramp slide; and the actuational portion is a cylinder attachment on the ramp-control plate.

12. A low-floor-vehicle ramp as described in claim 1 wherein:

the ramp-support member is pivotal outwardly and downwardly from a pivot point at the outside edge of the vehicle by contact with the ramp-support member in outward travel; and outwardly and downwardly pivotal travel from a vertical attitude of the ramp-support member is resisted resiliently by a support-member spring.

13. A low-floor-vehicle ramp as described in claim 14 wherein:

the support-member spring is an expansion-resistant coil spring having a proximal end affixed to an inward portion of the vehicle and a distal end affixed to a top portion of the ramp-support member.

14. A low-floor-vehicle ramp as described in claim 1 wherein:

the ramp floor has a non-skid top surface and a high-tensile metallic framework to which the side barriers are attached designedly at outside edges of the boarding-ramp assembly.

15. A low-floor-vehicle ramp as described in claim 1 wherein:

design attachment of the side barriers is foldable with hinges on which the side barriers are pivotal bidirectionally between an upright attitude at outside edges of the boarding-ramp assembly and a horizontal attitude on the ramp floor.

16. A low-floor-vehicle ramp as described in claim 15 wherein:

a forward side barrier is attached to a forward side of the boarding-ramp assembly with a hinge that is positioned intermediate a railing portion and a lever portion of the forward side barrier;

a forward barrier cable is attached to the lever portion of the forward-side barrier and routed first perpendicularly to an axis of the hinge and then in contact with an alignment member with which the forward barrier cable is routed colinearly with the axis of the hinge in an inward direction to a cable lever that is attached pivotally to the ramp-control plate;

a forward barrier-control buttress on the first-slide rail is positioned to engage a pivotal end of the cable lever and thereby to arrest outward travel of the pivotal end of the cable lever during a barrier-raising portion of outward travel of the boarding-ramp assembly;

a rearward side barrier is attached to a rearward side of the boarding-ramp assembly with a hinge that is positioned intermediate a railing portion and a lever portion of the rearward side barrier;

a rearward barrier cable is attached to the lever portion of the rearward-side barrier and routed first perpendicularly to an axis of the hinge and then in contact with an alignment member with which the rearward barrier cable is routed colinearly with the axis of the hinge in an inward direction to a cable lever that is attached pivotally to the ramp-control plate; and a rearward barrier-control buttress on the second-slide rail is positioned to engage a pivotal end of the cable lever and thereby to arrest outward travel of the pivotal end of the cable lever during a barrier-raising portion of outward travel of the boarding-ramp assembly.

17. A low-floor-vehicle ramp as described in claim 16 and further comprising:

a barrier-cable spring having expansion-resistant resilience positioned in the forward barrier cable designedly intermediate the cable lever and the lever portion of the forward side barrier; and a barrier-cable spring having expansion-resistant resilience positioned in the rearward barrier cable designedly intermediate the cable lever and the lever portion of the rearward side barrier.

18. A low-floor-vehicle ramp as described in claim 15 wherein:

a forward side barrier is hinged to a forward side of the boarding-ramp assembly with a hinge that is spring-tensioned to pivot the forward side barrier from a horizontal position to an upright position;

a forward barrier folder is positioned proximate an outside end of a forward side of the slideway;

the forward barrier folder has a cam surface that is bevelled to engage the forward side barrier in an upright attitude and to pivot the forward side barrier to a horizontal attitude vertically under the forward barrier folder during inward travel of the boarding-ramp assembly and conversely to allow upward positioning of the forward side barrier during outward travel of the boarding-ramp assembly;

a rearward side barrier is hinged to a rearward side of the boarding-ramp assembly with a hinge that is spring-tensioned to pivot the rearward side barrier from a horizontal position to an upright position;

a rearward barrier folder proximate an outside end of a rearward side of the slideway; and the rearward barrier folder has a cam surface that is bevelled horizontally to engage the rearward side barrier in an upright attitude and to pivot the rearward side barrier to a horizontal attitude vertically under the rearward barrier folder during inward travel of the boarding-ramp assembly and conversely to allow upward positioning of the rearward side barrier during outward travel of the boarding-ramp assembly.

19. A low-floor-vehicle ramp as described in claim 1 wherein:

the ramp actuator is a bidirectional motorized means with an operational switch positioned in operative proximity to a vehicular driving controls and having a backup gear with a gear fitting that is sized, shaped and structured for operation by a design type of hand-operative tools and motor-operative tools.

20. A low-floor-vehicle ramp as described in claim 19 wherein:

the gear fitting is positioned on a top portion of the backup gear; and a backup-operational access is positioned proximate the gear fitting in the vehicle.

* * * * *